(12) United States Patent
Grant (10) Patent No.: US 9,684,730 B1
(45) Date of Patent: Jun. 20, 2017

(54) SYSTEMS AND METHODS FOR DETERMINING FOOD MILES

(71) Applicant: Trimble Navigation Limited, Sunnyvale, CA (US)

(72) Inventor: Elliott Grant, Woodside, CA (US)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 14/071,882

(22) Filed: Nov. 5, 2013

Related U.S. Application Data

(63) Continuation-in-part of application No. 12/908,667, filed on Oct. 20, 2010, now Pat. No. 8,825,516, which is a continuation-in-part of application No. 12/206,156, filed on Sep. 8, 2008, now Pat. No. 7,909,239.

(60) Provisional application No. 60/970,933, filed on Sep. 7, 2007.

(51) Int. Cl.
*G06Q 10/00* (2012.01)
*G06F 17/30* (2006.01)

(52) U.S. Cl.
CPC ............... *G06F 17/30879* (2013.01)

(58) Field of Classification Search
CPC .................................. G06Q 30/0259
USPC ...................................... 705/14.57
See application file for complete search history.

(56) References Cited

U.S. PATENT DOCUMENTS

| 2002/0079368 | A1* | 6/2002 | Hankins | G06Q 30/06 235/383 |
| 2002/0174026 | A1* | 11/2002 | Pickover | G06Q 30/0601 705/26.1 |
| 2004/0137886 | A1* | 7/2004 | Ross | G06Q 30/02 455/414.1 |
| 2005/0076034 | A1* | 4/2005 | Addonisio | G06F 17/30289 |

OTHER PUBLICATIONS

"Traceability on the web—a prototype for the Portuguese beef sector", M de Castro Neto, MBL Rodrigues, PA Pinto . . . —EFITA 2003 . . . , 2003—certag.com.br.*
"Food, Fuel, and Freeways: An Iowa perspective on how far food travels, fuel usage, and greenhouse gas emissions",RS Pirog, T Van Pelt, K Enshayan, E Cook—2001—lib.dr.iastate.edu.*
Cerere: an information system supporting traceability in the food supply chain MGCA Cimino, B Lazzerini, F Marcelloni, A Tomasi—null, 2005—computer.org.*
Traceability from a European perspective F Schwagele—Meat science, 2005—Elsevier.*
Traceability from a US perspective GC Smith, JD Tatum, KE Belk, JA Scanga, T Grandin . . . —Meat science, 2005—Elsevier.*
Using ebXML for supply chain traceability A Bechini, MGCA Cimino, A Tomasi— . . . : E-Commerce, E-Business, and E— . . . , 2005—Springer.*

(Continued)

*Primary Examiner* — Jonathan G Sterrett
(74) *Attorney, Agent, or Firm* — Kilpatrick Townsend & Stockton LLP (57) ABSTRACT

Food miles for a product can be determined by comparing a present location for the product to an origin location. A traceability code associated with the product is linked to the origin location, while the present location can be determined in a variety of ways such as with the GPS capabilities of a mobile device. The food miles can be provided on an electronic signage in a retail store, or displayed on a mobile device.

5 Claims, 4 Drawing Sheets

(56) References Cited

OTHER PUBLICATIONS

FMECA approach to product traceability in the food industry M Bertolini, M Bevilacqua, R Massini—Food Control, 2006—Elsevier.*

Willingness to pay for locally produced foods: A customer intercept study of direct market and grocery store shoppers K Darby, MT Batte, S Ernst . . . —Selected Paper prepared . . . , 2006—ageconsearch.umn.edu.*

Retailing local food in the Scottish—English borders: A supply chain perspective B Ilbery, D Maye—Geoforum, 2006—Elsevier.*

Traceability perception of beef: a comparison between Spanish and Italian consumers C Mora, D Menozzi, G Faioli . . . —Seminar Paper, . . . , 2006—ageconsearch.umn.edu.*

Sustainability of certified production systems: the case of labels in the food sector G Van Huylenbroeck, W Steurbaut, M Mormont . . . —2006—orbi.ulg.ac.be.*

Traceability of food products Y Sarig—2003—ecommons.library.cornell.edu.* iGrocer: a ubiquitous and pervasive smart grocery shopping system S Shekar, P Nair, AS Helal—Proceedings of the 2003 ACM symposium . . . , 2003—dl.acm.org.*

* cited by examiner

SYSTEMS AND METHODS FOR DETERMINING FOOD MILES

CROSS-REFERENCE TO RELATED APPLICATIONS

This application is a Continuation-In-Part of U.S. patent application Ser. No. 12/908,667 filed on Oct. 20, 2010 and entitled "Methods for Correlating First Mile and Last Mile Product Data" which is a Continuation-In-Part of U.S. patent application Ser. No. 12/206,156 filed on Sep. 8, 2008 and entitled "Attributing Harvest Information with Unique Identifiers," now U.S. Pat. No. 7,909,239, which claims the benefit of U.S. Provisional Patent Application 60/970,933 filed Sep. 7, 2007 and also entitled "Attributing Harvest Information with Unique Identifiers" all of which are incorporated herein by reference. This application is related to U.S. patent application Ser. No. 13/053,200 filed on Mar. 21, 2011 and also entitled "Attributing Harvest Information with Unique Identifiers," now U.S. Pat. No. 8,342,393; further related to U.S. patent application Ser. No. 12/877,467 filed on Sep. 8, 2010 and entitled "Lot Identification Codes for Packaging;" and further still related to U.S. patent application Ser. No. 13/034,208 filed on Feb. 24, 2011 and entitled "Methods for Assigning Traceability Information to and Retrieving Traceability Information from a Store Shelf," now U.S. Pat. No. 8,210,430; all of which are incorporated herein by reference.

BACKGROUND OF THE INVENTION

Field of the Invention

The present invention is in the field of fresh food distribution and more particularly relates to providing consumers with information about the distances travelled by fresh foods in stores.

Description of the Prior Art

Consumers are increasingly interested in knowing where their food comes from, and about the sustainability of growing practices. Two outcomes of this changing behavior is the increasing interest in "food miles" and the emergence of what has been colloquially known as "locavorism." Simply put, food miles are the literal distance in miles that the food has traveled from the farm to the consumer and "locavores" are people who aim to minimize the food miles of what they eat. "Locavorism" is often satisfied by shopping at farmers' markets, but in response to these demands, food retailers and foodservice operators are also keen to demonstrate their local sourcing practices, whenever practical. Oftentimes, this is achieved with a display of produce that is locally sourced.

There is no single definition of "local" in terms of the geographic distance between production and consumption. In 2008 Congress passed H.R.2419, which amended the "Consolidated Farm and Rural Development Act." In the amendment "locally" and "regionally" are grouped together and are defined as "(I) the locality or region in which the final product is marketed, so that the total distance that the product is transported is less than 400 miles from the origin of the product; or (II) the State in which the product is produced."

Satisfying the demand to know whether or not food is locally sourced is challenging for large retailers with wide distribution networks that can span many hundreds of miles. Such retailers want to ensure their labeling is accurate, however, it can be impractical to print 'local' signs and position them among the merchandise consistently, when the product is being received from different sources into one or more distribution centers, sometimes on the same day, and being distributed to retail locations over a wide geographic area. Consequently, sometimes a product in a given retail store will come from a source within 400 miles and can be labeled as "local," and sometimes not, and for many products in that store the "local" status will change frequently.

SUMMARY

The present invention provides systems and methods for determining distances traversed by consumer products, most notably fresh foods, and for providing this information to consumers. The present invention allows retailers to conveniently customize in-store displays with such information, and allows consumers to easily access such information using their mobile devices.

An exemplary system of the present invention is intended for use in retail stores and provides information about products to consumers, including whether the products are locally sourced or not. The exemplary system comprises a computing system, a machine-readable code, and a mobile device. The computing system includes an electronic signage and logic configured to provide a network connection, receive a web page over the network connection, and to provide the web page to the electronic signage. The computing system can take different forms, in various embodiments. In some embodiments, the computing system comprises a tablet device, where the tablet device includes both the electronic signage and the logic. In other embodiments, the computing system comprises a workstation in communication with the electronic signage, where the workstation includes the logic.

The electronic signage is disposed proximate to a store display of a product and the machine-readable code serves to identify the electronic signage. In some embodiments the electronic signage provides the machine-readable code, while in other embodiments the machine-readable code is disposed proximate to the electronic signage. The mobile device includes logic configured to provide another network connection that is wireless, and logic configured to read the machine-readable code. The mobile device is used to link products, stocked to the store display, with the electronic signage by reading the machine-readable code for the electronic signage and by reading other machine-readable codes associated with the products. The mobile device can be customized for this task by including an application configured to provide prompts to read the machine-readable codes.

Another exemplary system of the present invention supports the in-store system described above. This exemplary system comprises a database and a web server, where the network connections noted above are made to the web server. The database includes records that associate traceability codes with lot-specific information. The web server includes logic configured to access the database, maintain a web page associated with a display ID, receive a traceability code together with the display ID, use the traceability code to retrieve a record from the database, and modify the web page according to lot-specific information contained in the record.

In various embodiments, the lot-specific information includes an origin location, and the web server is configured to determine a distance between the origin location and another location associated with the display ID. The web server can also be configured to modify the web page according to the lot-specific information by including in the web page an indication that a product is locally sourced when the determined distance is less than some threshold. In still other embodiments, the system further comprises a mobile device including logic configured to read a first machine-readable code comprising the traceability code, read a second machine-readable code comprising the display ID, and communicate the traceability code together with the display ID to the web server.

An exemplary method of the present invention that would be performed, for example, by the web server of the above system comprises receiving a traceability code together with a display ID over a network connection, using the traceability code to retrieve an origin location from a record of a database, determining a store location, and determining, with the web server, a distance between the origin location and the store location. In various embodiments, determining the store location includes receiving a location together with receiving the traceability code and the display ID, or determining the store location includes using the display ID to retrieve the store location from the database, or another database.

In some embodiments the method further comprises maintaining a first web page associated with the display ID, determining that the distance is less than a threshold, and modifying the first web page to include an indication that a product is locally sourced, responsive to determining that the distance is less than the threshold, such as by including the determined distance or by including a badge or icon that signifies a local source. In these embodiments, the first web page is maintained by the web server. In still further embodiments the method further comprises using the traceability code to retrieve lot-specific information from the record, and modifying the first web page to include the lot-specific information. The method can also further comprise maintaining, with the web server, a second web page associated with the display ID and configured to display content on mobile devices. In some of these embodiments the method further comprises using the traceability code to retrieve lot-specific information from the record, and modifying the second web page to include the lot-specific information.

Another exemplary method of the present invention is for updating an electronic signage, such as by a store associate. This method comprises, or consists essentially of, stocking a store display with a product, where the electronic signage is proximate to the store display, reading, with a mobile device, a first machine-readable code associated with the product, and reading, with the mobile device, a second machine-readable code associated with the electronic signage.

DETAILED DESCRIPTION OF THE INVENTION

The present invention is directed to systems and methods for determining the food miles of products, such as fresh produce, at various locations, for example at the point of sale. Item-level traceability technology (e.g., as described in U.S. Pat. Nos. 7,909,239 and 8,342,393 and U.S. patent application Ser. No. 12/877,467) provides the ability to determine an initial origin location of a product through the use of traceability codes, while the present location of the product can be determined in a number of different ways with differing levels of accuracy. For example, the product's location can be assumed to be the same as that of a mobile device used to read a traceability code associated with the product. The location of the mobile device can be determined, for example, by using the GPS capability of the mobile device itself, or by resolving the IP address of the mobile device and using the IP address to determine the product location.

Using the origin location of the product together with the product's present location, the miles traveled either point-to-point "as the crow flies" or along a reasonable road route (e.g. using a mapping application) can be determined. Based on this result, a determination can be made whether the produce is "local" or not. In some embodiments the determination allows retailers to display signage that indicates to consumers that a product is "local." In other embodiments consumers can use their personal electronics to determine food miles for various products.

Figure 1:
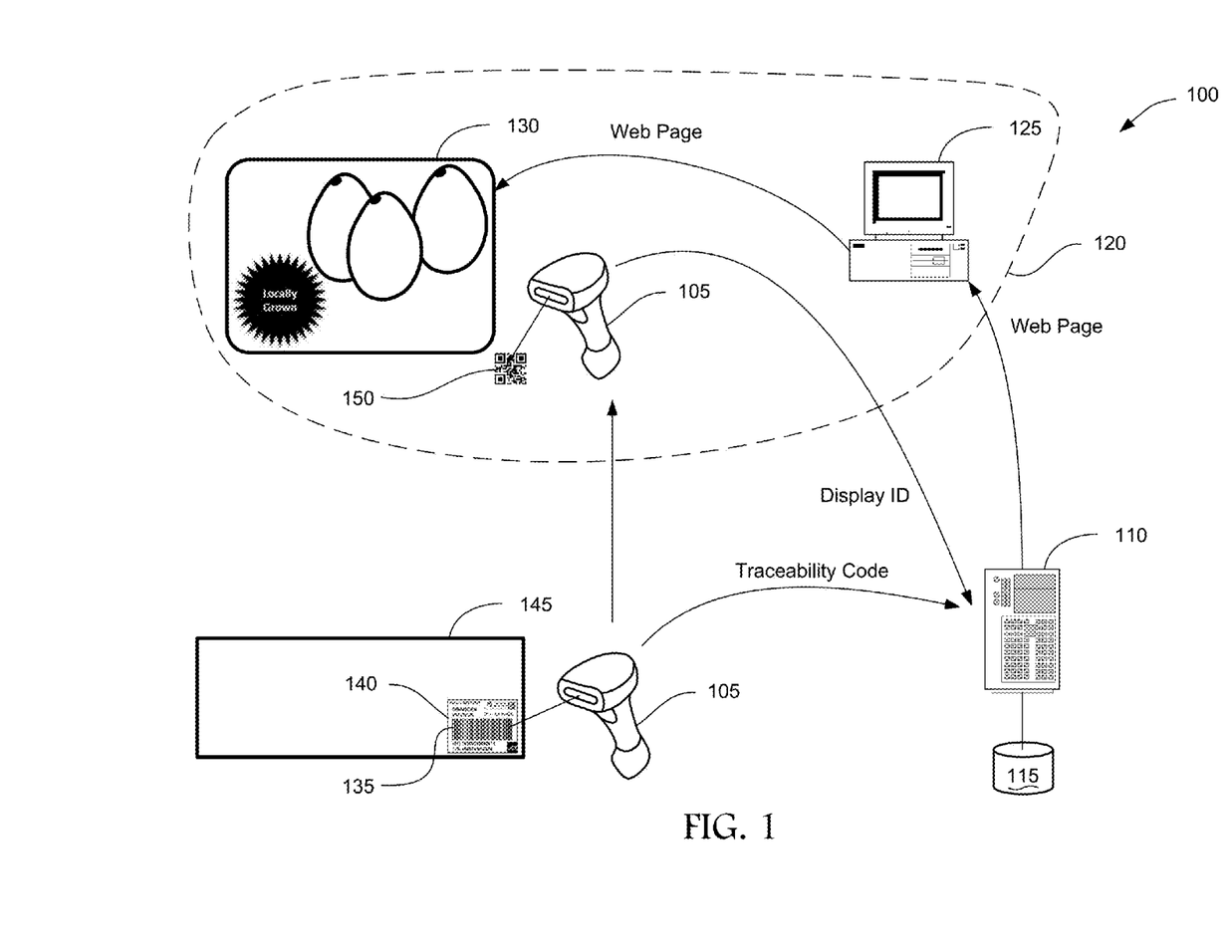
FIG. 1 is a schematic representation of a system according to an exemplary embodiment of the present invention.

FIG. 1 illustrates an exemplary system 100 for displaying information to consumers to show whether products in a retail outlet, such as a grocery store, are locally sourced. The system 100 includes a mobile device 105 able to communicate with a web server 110 having access to a database 115. The system 100 further includes a computing system 120, represented in FIG. 1 as a workstation 125 such as a personal computer (PC), laptop computer, or tablet device, for example, in communication with an electronic signage 130, in this case a video monitor mounted proximate to a store shelf or to a bin for displaying a product. The electronic signage 130 may be in either wired or wireless communication with the workstation 125. The workstation 125 includes logic sufficient to provide a connection to a network such as the Internet or a cellular network, to receive a web page over the network connection, and to provide the web page to the electronic signage 130.

In other embodiments, the computing system 120 can simply consist of a tablet computing device ("tablet device" hereafter) mounted proximate to the store shelf or bin in place of the workstation 125 and electronic signage 130 of FIG. 1. In these embodiments, a screen of the tablet device comprises the electronic signage 130 and the tablet device provides the network connection to the web server 110. It will be appreciated that any device or system can replace the tablet device so long as it includes a sufficient monitor, an ability to provide a network connection to the web server 110, and an ability to provide a web page to that monitor, such as through logic including a modem or cellular radio transceiver, a microprocessor, an operating system, and a web browser. An exemplary specialty device for retail applications resembles a tablet device but lacks one or more of the touch-screen display, the audio output, and the external power switch. Control over such a device can be achieved through a remote control, for example.

A mobile device 105, as used herein, refers to a handheld computing device having a display such as a touchscreen, logic configured to wirelessly connect to a network, and logic configured to read machine-readable codes. Exemplary mobile devices 105 include smartphones and tablet devices having touchscreens, wireless network connectivity, optical cameras, and software applications (apps) that can extract machine-readable code from captured images. Exemplary mobile devices 105 also include specialized handheld devices, such as the one illustrated in FIG. 1, that include one or more of an optical camera, a laser-based scanning device, or an RFID reader to read machine-readable codes.

In operation within a retail outlet, for instance, a store associate stocks a bin or store shelf with products, such as fresh produce or baked goods. The associate uses the mobile device 105 to read a machine-readable code 135 associated with the product. In the illustrated example of FIG. 1, the machine-readable code 135 is disposed on a case label 140 of a case 145 of the product, but in other embodiments the machine-readable code 135 can be disposed on the product itself, for instance by being printed on product packaging or printed on a label adhered to the product or packaging. An example of a case label 140 with a suitable machine-readable code 135 is a Produce Traceability Initiative (PTI) label, a label that conforms to the specifications of the Initiative, and therefore includes an identifier of the supplier, the product, and a lot code. The machine-readable code 135 can simply be a traceability code or can encode a traceability code together with other information such as a network address for the web server 110. Examples of machine-readable codes that encode network addresses together with traceability codes are disclosed, for example, in U.S. patent application Ser. No. 13/933,797 filed Jul. 2, 2013 and entitled "Methods for Crowd-Sourcing Food Quality and Freshness Information" which is incorporated herein by reference.

Examples of suitable traceability codes include case codes such as those discussed, for example, in U.S. patent application Ser. No. 13/736,521 filed on Jan. 8, 2013 and entitled "Methods for Assigning Traceability Information to and Retrieving Traceability Information from a Store Shelf" which is incorporated herein by reference. Other traceability codes include lot codes marked on product packaging as discussed, for example, in U.S. patent application Ser. No. 12/877,467 noted previously, and unique codes provided on individual items such as PLU labels as described, for instance, in U.S. patent application Ser. No. 12/359,151 filed on Jan. 23, 2009 and entitled "Adding Traceability Codes to Produce Labels without Increasing the Size thereof" which is incorporated herein by reference.

The machine-readable code 135 is provided in a machine-readable format such as a barcode, a QR code, a string of characters, or code stored by an RFID tag. Reading the machine-readable code 135 with the mobile device 105 can therefore comprise scanning the machine-readable code 135 with a laser-based barcode reader, imaging the machine-readable code 135 with an optical camera, or querying the RFID tag with an RFID reader, in various embodiments.

Regardless of whether the traceability code is associated with an individual item of the product or a case 145 of the product, the traceability code is initially recorded in the database 115 at or around the time of harvest or production, and therefore well before the machine-readable code 135 is read by the mobile device 105. The traceability code can be stored in the database 115 as one field of a record that also includes an origin location for the product, or includes a pointer to another database that includes the origin location. The origin location can be represented by coordinates such as latitude and longitude, by a street address, or less specifically by a zip code, a county and state, or a country of origin. The location information can also be an identifier for a particular location such as the name of a farm. In this latter case, the identifier can be used to look up a street address, zip code, latitude/longitude pair, etc.

Returning to the method described with respect to FIG. 1, after the associate reads the machine-readable code 135 with the mobile device 105, the associate uses the same mobile device 105 to associate the computing system 120 to the product being stocked so that the electronic signage 130 can provide information pertinent to that product, including whether the product is locally sourced. The association can be made, for example, by reading a machine-readable display code 150 associated with the computing system 120 and provided in a machine-readable format such as a barcode, a QR code, a string of characters, or code stored by an RFID tag. The machine-readable display code 150 serves to uniquely identify the computing system 120 or the electronic signage 130 in those embodiments where one workstation 125 supports multiple instances of electronic signage 130. As with the machine-readable code 135, the machine-readable display code 150 can simply be a unique ID for the computing system 120 or for an instance of the electronic signage 130, or can encode the unique ID together with the network address for the web server 110. The unique ID encoded by the machine-readable display code 150 will be referred to herein as the display ID.

In various embodiments, the machine-readable display code 150 can be displayed proximate to the electronic signage 130, as illustrated, such as on a label on the store shelf or a label on the bin being stocked, or encoded by an RFID tag in or on the electronic signage 130, the shelf, or the bin. The machine-readable display code 150 can also be displayed by the electronic signage 130. As above, reading the machine-readable display code 150 with the mobile device 105 can comprise scanning with a laser-based barcode scanner, imaging with an optical camera, or querying an RFID tag with an RFID reader, in various embodiments. In some embodiments the machine-readable display code 150 is read first by the mobile device, followed by the machine-readable code 135. In some embodiments, the mobile device 105 runs an application that prompts the associate to read either code 135, 150 than the other, and provides a confirmation to the associate after each successful step.

The mobile device 105 establishes a communication channel with the web server 110 to communicate the display ID and traceability code thereto, so that the electronic signage 130 can then be customized according to information stored by the database 115 in association with the traceability code. The communication can be across a wireless network such as the Internet or a cellular phone network, for example. The communication channel can be established in a variety of ways. In one example, the mobile device 105 runs an application configured with a network address for the web server 110, and when either machine-readable code 135, 150 is read, the application connects the mobile device 105 to the web server 110. In other embodiments, the machine-readable code 135 encodes the address for the web server 110, as noted above, or in the alternative the machine-readable display code 150 encodes the address for the web server 110. In these embodiments the mobile device 105 includes an application configured to decode the code 135 or 150 to obtain the network address for the web server 110 and to establish the connection thereto.

Once the mobile device 105 has established a communication channel with the web server 110, the mobile device 105 provides at least the traceability code and the display ID to the web server 110. In some embodiments, the mobile device 105 also provides its location to the web server 110 to serve as a product location in determining food miles, while in other embodiments the product location is determined by the web server 110, as discussed further below.

The web server 110 maintains a web page dedicated to the display ID. For instance, if the display ID is A12345 the web server 110 can maintain a web page with an address like www.example.com/A12345, where the domain www.example.com is the network address for the web server 110 and the extension A12345 specifies the particular display ID. The computing system 120 is configured to request the web page from the web server 110 by establishing a network connection to the address including the display ID. The computing system 120 receives the web page and provides the web page to the electronic signage 130.

When the web server 110 receives a new traceability code for a given display ID, the web server 110 updates the web page dedicated to that display ID by retrieving a record from the database 115 associated with the received traceability code. Information about the product can be determined, at least non-lot-specific information and in some instances also lot-specific information, from the database record. Non-lot-specific information can comprise a brand, the type of product (e.g., carrots, dinner rolls, etc.) and so forth. Lot-specific information can comprise lot numbers and harvest and production locations (origin locations), times, and production methods (organic, sustainable), for example. The web server 110 can use the lot-specific and non-lot-specific information to populate the web page with, for example, images of the product, photos of the source of the product (e.g., of the farm and field), nutritional information, a QR code linked to another web page that can provide recipes, coupons, promotional offers, and the like, and the web server 110 can also optionally request information from the computing system 120, stored by another database (not shown), to further customize the web page with retailer artwork, prices, and so forth.

In some embodiments, the web server 110 customizes the web page with an estimate of the food miles, or information about the origin location, or some indication of whether the product is locally sourced, like a badge or icon. An estimate of the food miles can be determined using the origin location and the present location of the product to determine a distance therebetween. As noted above, the record associated with the traceability code provides the origin location.

The location of the product (which is also the store location) can be determined as the location of the mobile device 105 or the location of the electronic signage 130, and the location of the mobile device 105 can be determined in a variety of ways, including that the mobile device 105 can report the mobile device's location to the web server 110 as a proxy for the product location, the web server 110 can estimate the location of the mobile device 105, or the mobile device 105 can additionally provide a mobile device or store identification to the web server 110 where the identification is linked to the store location to be used as a proxy for the product location.

In some embodiments where the mobile device 105 reports its location to the web server 110, the mobile device 105 determines its position by using GPS technology or cellphone tower triangulation, for example. In other embodiments, the store associate inputs the location through an input field on the display of the mobile device 105, optionally in response to a prompt. The location of the mobile device 105 can also be determined by the web server 110 from an IP address of the mobile device 105, in further embodiments. The mobile device 105 can additionally provide an identification for itself or for the store to the web server 110, where the identification has been linked to the store location. For example, a database such as database 115 or another database accessible to the web server 110 can include records of store locations associated with such identifiers. Likewise, store locations can be indexed to display IDs, in some embodiments, so that the display ID is used to determine the store location.

In those embodiments in which the web server 110 customizes the web page with an estimate of the food miles, the web server 110 determines a distance between the origin location and the product location. The determined distance may be the miles traveled either point-to-point "as the crow flies" or along a reasonable road route (e.g. using a mapping application). In instances where a location, either the origin location or the product location, is not accurately known, such as where the origin location is resolved from the IP address, or is a country of origin, a zip code, or a county, a particular set of coordinates or a street address can be substituted and used in the determination. For example, the address for the main post office within the zip code, the geographical center of the country of origin, or the street address of the county government building can be used as the origin location in order to estimate of the food miles. In some instances, such as where the country of origin is far removed from the product location, the inaccuracy of the origin location will not be material to whether or not the product can be said to be "local" but will at least provide a reasonable estimate of the distance from the origin location to the product location. Where the web server 110 determines a distance between the origin location and product location is within a threshold limit, such as 400 miles, the web page can be customized to include a "locally grown" badge (as shown in FIG. 1) or a similar indicator to show that the product is locally sourced.

Accordingly, the invention provides simple methods for store associates to update electronic signage 130. An exemplary method of the same consists essentially of three steps. In a first step, a store associate stocks a store display with a product, the electronic signage 130 being proximate to the store display. In a second step, the store associate employs a mobile device 105 to read a traceability code associated with the product, and in a third step the store associate employs the mobile device 105 to read a display code for the electronic signage 130. These steps can be performed in any order, depending on the embodiment.

Further such methods can comprise the three noted steps as well as additional steps. For instance, the store associate can first launch an application on the mobile device 105. The application can prompt the store associate to confirm a location, or to enter a location, in some embodiments. The application can also prompt the store associate to use the mobile device 105 to read a machine-readable code 135 for the product and to read a machine-readable display code 150 for the electronic signage 130. Reading these codes with the mobile device 105 can include imaging a code with an optical camera, scanning the code with a laser barcode reader, or reading an RFID tag with an RFID reader. Reading the machine-readable code 135 can comprise, in various embodiments, reading the code off of a case 145 of the product or off of an individual unit of the product. If a machine-readable code cannot be read by the mobile device 105, the store associate optionally can read the code, if presented in a human-readable format, and manually enter the same into the mobile device 105.

Figure 2:
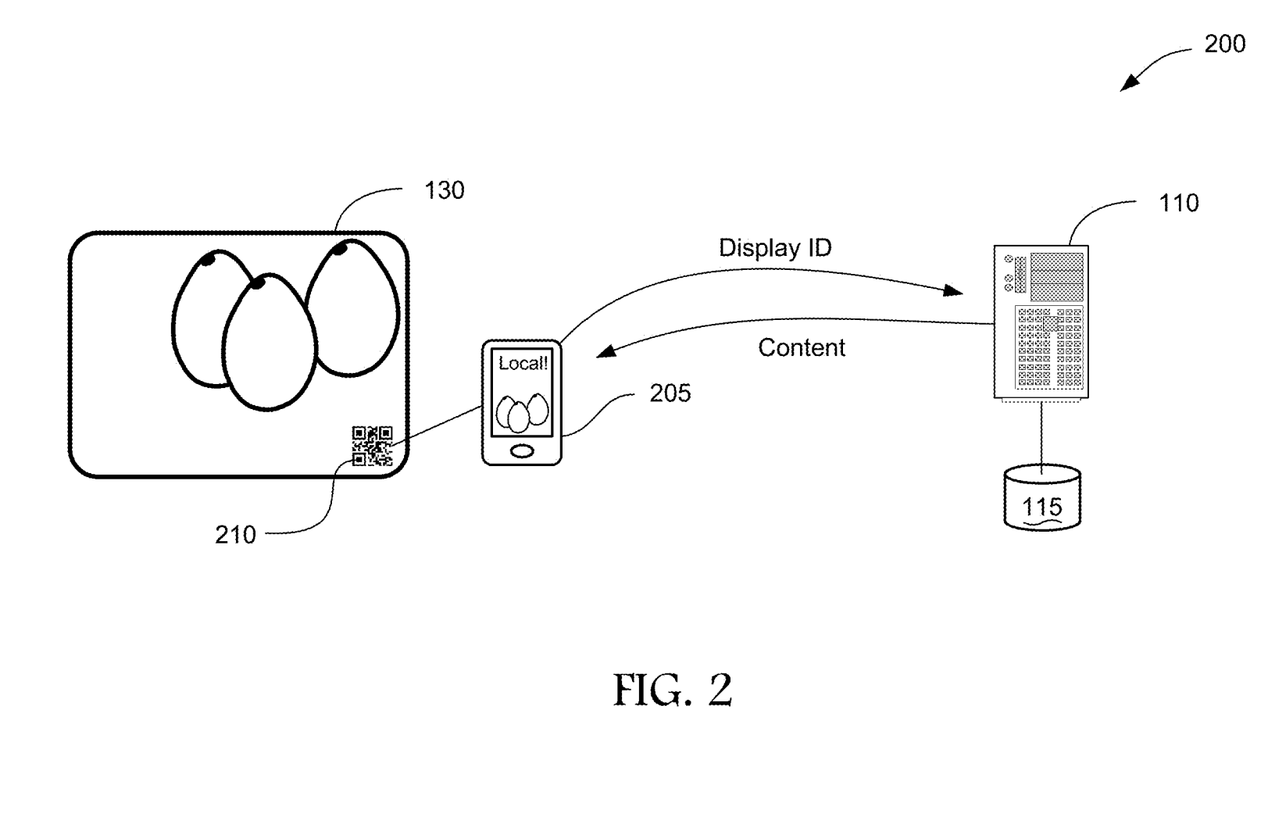
FIG. 2 is a schematic representation of a system according to another exemplary embodiment of the present invention.

FIG. 2 illustrates another exemplary system 200 for displaying information to consumers to show whether products are locally sourced. The system 200 includes a mobile device 205 able to communicate with a web server 110 having access to a database 115. A consumer, for example, can use the mobile device 205 to read a machine-readable mobile code 210 to obtain information about a product, such as food miles. The machine-readable mobile code 210 can be disposed on a shelf tag, electronic signage 130, or some other point within a retail outlet. The machine-readable mobile code 210 is provided in a machine-readable format such as a barcode, a QR code, or a string of characters.

In these embodiments, the web server 110 also maintains a second web page dedicated to the display ID, but here the second web page is customized for display on mobile devices (see FIG. 4) rather than on the electronic signage 130, and can optionally provide a different set of information than the first web page for the electronic signage 130. For example, if the display ID is A12345, the web server 110 can maintain a second web page with an address like www.example.com/A12345/mobile, where the extension A12345/mobile specifies the particular display ID and also indicates that the second web page is intended for delivering content to mobile devices such as mobile device 205. When the web server 110 receives a new traceability code for a given display ID, the web server 110 can additionally update the second web page by retrieving the record from the database 115 associated with the received traceability code, as previously described.

Figure 3:
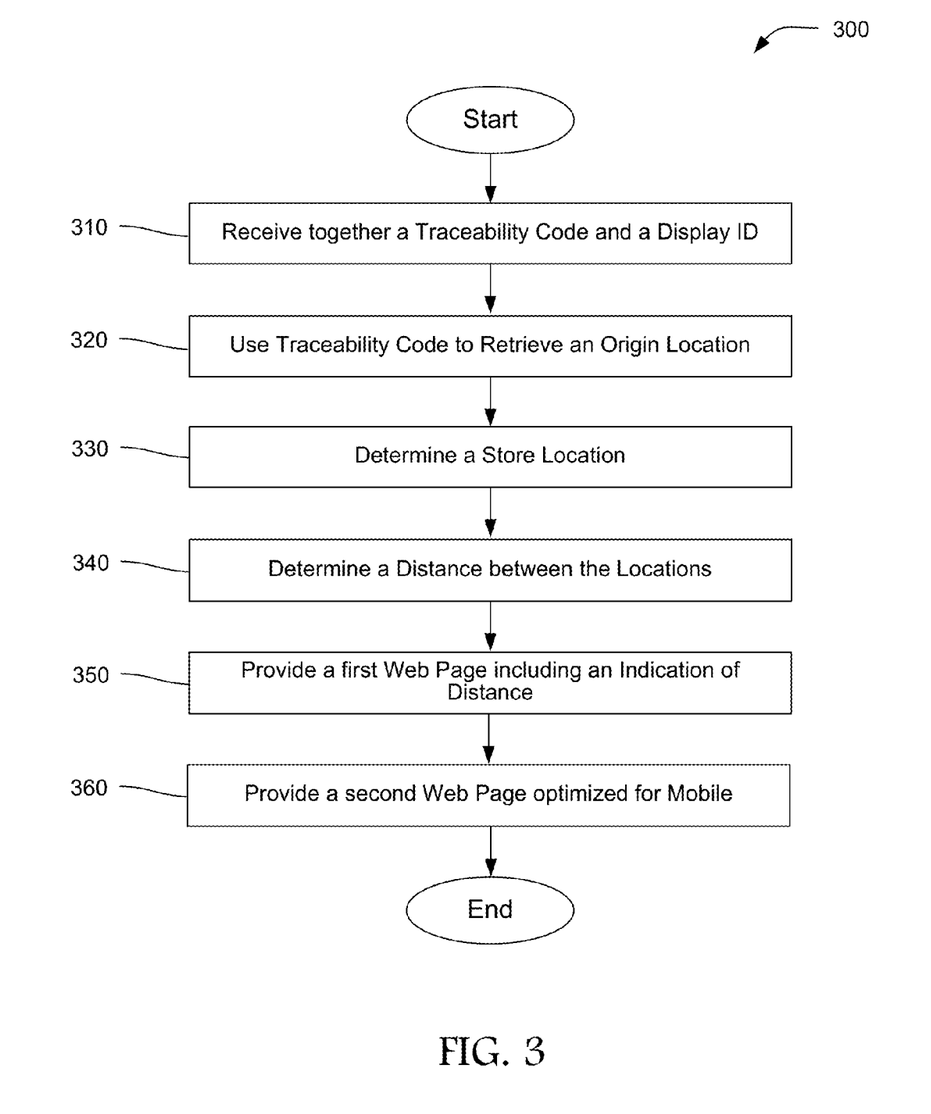
FIG. 3 is a flowchart representation of a method according to an exemplary embodiment of the present invention.

Exemplary methods that may be performed by the web server 110, for example, are illustrated by method 300 of the flow chart of FIG. 3. In an initial step 310, the web server 110 receives a traceability code together with a display ID. In these embodiments, the mobile device 105 is used to read machine-readable codes 135 and 150, causing the mobile device 105 to establish a connection with the web server 110 and to transmit the traceability code and the display ID.

In a step 320 the web server 110 uses the traceability code to retrieve an origin location. As discussed above, the traceability code can be used to search a database 115 to find a record that includes the origin location for the product.

In a step 330 the web server 110 determines a store location. As discussed above, determining the store location can be achieved, for example, by receiving a location from the mobile device 105, or can be estimated from an IP address of the mobile device 105, or can be retrieved from a stored record that associates the store location with the display ID. In a step 340 the web server 110 determines a distance between the origin location and the product location, both as generally described above with respect to FIG. 1.

Then, in a step 350, the web server 110 provides a first web page that includes an indication of the distance determined in step 340 and optionally other information. The first web page can be optimized for in-store electronic signage 130 with either or both of non-lot-specific and lot-specific information about the product, where such information is retrieved from the record associated with the received traceability code. The first web page can optionally include retailer artwork, prices, and so forth to customize the first web page for the particular store.

In an optional step 360 the web server 110 provides a second web page associated with the display ID and configured to display content on mobile devices. As in step 350, the second web page can be populated with either or both of non-lot-specific and lot-specific information about the product, where such information is retrieved from the record associated with the received traceability code. An exemplary second web page 400 is illustrated in FIG. 4 as displayed by mobile device 205.

Figure 4:
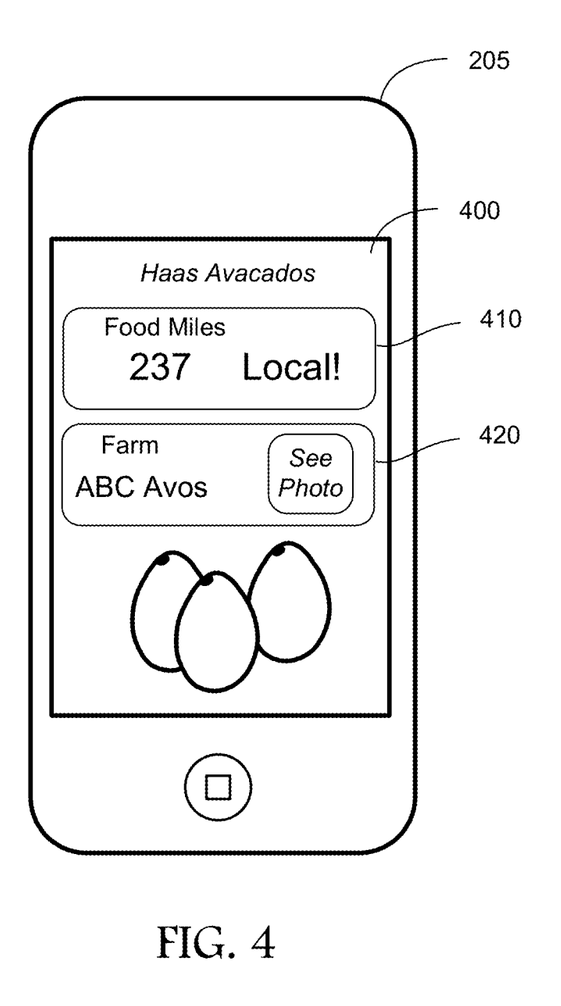
FIG. 4 is an illustration of a mobile device displaying information about a product according to an exemplary embodiment of the present invention.

As shown in FIG. 4, the web page 400 for the product can be further customized for the consumer with the indication of the distance 410, which can be the actual determined distance, or an icon indicating only that the distance is below the threshold for the product to be considered locally sourced, or both. The web page 400 can also include lot-specific information 420 retrieved from the record along with the origin location. Further information, such as nutritional information, recipes, coupons, special offers, and the like can be included in the web page 400 or the web page 400 can include links to such.

An application for the mobile device 205 optionally can provide additional functionality to consumers. For example, the application can maintain a sum of all of the distances calculated for all of the products queried during a visit to a retailer. These sums can be stored and compared against the results from other visits. The carbon footprint for particular items, or for the sum of all items, can also be determined, either by the application on the mobile device 205 or by the web server, and presented to the consumer, in other embodiments.

Logic described herein can comprise, for example, hardware, such as application-specific integrated circuits (ASICs), specifically designed to perform the particular described functions. Logic can also comprise firmware residing, for instance, in read only memory (ROM) or flash memory, where the firmware is programmed to perform the particular described functions. Logic can also comprise a microprocessor capable of executing software residing in a memory, for example, in random access memory (RAM), where the computer instructions embodied in the software, when executed by the microprocessor, perform the particular described functions. Any combination of two or more of hardware, firmware, and software can also comprise logic. Hardware, firmware, and/or software can be embodied in hand-held devices such as smart phones running third-party applications, for example. Logic comprising hardware, firmware, and/or software can also be embodied in various types of computing systems such as web servers and personal computers. It will be appreciated that such computing systems, when configured to follow specific logic embodied in their circuits or programming instructions, or both, constitute specific machines.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A system for more accurately determining and displaying information about a product at a store, the system comprising:
   a shelf or a bin at the store;
   the product, wherein:
      the product is positioned on the shelf or in the bin; and
      the product comprises a first code, wherein:
         the first code is machine readable; and
         the first code is displayed on the product;

a specialty device, the specialty device comprising:
  a power source that is remotely controlled, such that the specialty device is not turned off or on by a power switch on the specialty device; and
  an electronic signage, wherein:
    the electronic signage is associated with a display ID,
    the electronic signage is configured to display a web page that includes information about the product,
    the web page includes an image of a source of the product,
    the web page includes an image of the word "local" based on a distance between an origin location and a current location of the product,
    a second code is associated with the display ID,
    the second code is machine readable,
    the electronic signage is mounted at the store, in association with the product, so that the electronic signage is not readily movable, and
    the specialty device lacks a touch screen or an audio output;
  a first database configured to store a record of the product, the record including a traceability code associated with the first code and lot-specific information about the product including the origin location of the product;
  a second database, separate from the first database, the second database configured to store retailer information including a price of the product;
  a code reader, wherein:
    the code reader is configured to scan, using optics, the first code to retrieve the traceability code;
    the code reader is configured to scan, using optics, the second code to retrieve the display ID; and
    the code reader is different than the specialty device; and
  a web server including logic configured to:
    receive the traceability code and the display ID retrieved from the code reader,
    access the first database, using the traceability code from the first code retrieved using the code reader, to obtain the lot-specific information including the origin location,
    determine the current location of the product based on the display ID of the electronic signage from the second code retrieved using the code reader,
    determine a distance between the origin location and the current location of the product,
    access the second database to obtain the retailer information, and
    provide the web page to the electronic signage, the web page including an indication of the distance between the origin location and the current location, at least a portion of the lot-specific information other than the origin location, at least a portion of the retailer information, and the price of the product.

2. The system of claim 1 wherein the web server is configured to compare the distance between the origin location and the current location to a threshold, and to indicate that a product is locally sourced when the determined distance is less than the threshold.

3. The system of claim 1 wherein the code reader includes logic configured to communicate the traceability code together with the display ID to the web server.

4. A method for more accurately determining and displaying information about a product at a store, the method comprising:
  associating a traceability code with a product;
  positioning the product on a shelf or in a storage bin at the store;
  displaying a first code on the product, wherein the first code is machine readable;
  associating a display ID with an electronic signage, wherein:
    the electronic signage is part of a specialty device;
    the specialty device lacks a touch screen or an audio output; and
    the specialty device comprises a power source that is remotely controlled;
  mounting the electronic signage at the store, in association with the product, so that the electronic signage is not readily movable;
  associating a second code with the display ID, wherein the second code is machine readable;
  scanning, using a code reader, the first code to retrieve the traceability code;
  scanning, using the code reader, the second code to retrieve the display ID;
  receiving, at a web server, the traceability code and the display ID over a network connection;
  using, at the web server, the traceability code to retrieve a record from a first database, the record including lot-specific information about the product including an origin location of the product;
  determining, at the web server, a current location of the product based on the display ID of the electronic signage from the second code retrieved using the code reader;
  determining, at the web server, a distance between the origin location of the product and the current location of the product;
  retrieving, at the web server, store information including a price of the product from a second database; and
  providing, from the web server, a web page to the specialty device using the display ID, the web page including:
    an indication that the product is locally sourced,
    an image of a source of the product,
    an image of the word "local" based on the distance,
    at least a portion of the lot-specific information other than the origin location,
    at least a portion of the store information, and
    the price of the product; and
  remotely turning off the power source of the specialty device.

5. The method of claim 4 further comprising:
  determining that the distance between the origin location of the product and the store location is less than a threshold.

* * * * *